United States Patent
Cudak et al.

(10) Patent No.: US 9,465,659 B2
(45) Date of Patent: Oct. 11, 2016

(54) DYNAMIC TASK COMPLETION SCALING OF SYSTEM RESOURCES FOR A BATTERY OPERATED DEVICE

(71) Applicant: LENOVO ENTERPRISE SOLUTIONS (SINGAPORE) PTE. LTD., Singapore (SG)

(72) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 504 days.

(21) Appl. No.: 13/719,600

(22) Filed: Dec. 19, 2012

(65) Prior Publication Data

US 2014/0173617 A1 Jun. 19, 2014

(51) Int. Cl.
  *G06F 9/48* (2006.01)
  *G06Q 10/10* (2012.01)
  *G06F 1/32* (2006.01)

(52) U.S. Cl.
  CPC .......... *G06F 9/4893* (2013.01); *G06F 1/3206* (2013.01); *G06F 1/3265* (2013.01); *G06Q 10/10* (2013.01); *G06F 1/3212* (2013.01); *Y02B 60/1242* (2013.01); *Y02B 60/1292* (2013.01); *Y02B 60/144* (2013.01)

(58) Field of Classification Search
  None
  See application file for complete search history.

(56) References Cited

U.S. PATENT DOCUMENTS

| | | | |
|---|---|---|---|
| 7,595,642 B2 | 9/2009 | Doyle | |
| 8,073,498 B2 | 12/2011 | Reinisch et al. | |
| 8,484,652 B2 * | 7/2013 | Teshome et al. | 718/103 |
| 8,655,307 B1 * | 2/2014 | Walker et al. | 455/405 |
| 8,843,774 B2 * | 9/2014 | Chen et al. | 713/320 |
| 2007/0271566 A1 * | 11/2007 | Greiner | G06F 9/30003 718/100 |
| 2008/0201587 A1 * | 8/2008 | Lee | 713/320 |
| 2009/0187780 A1 * | 7/2009 | Keohane et al. | 713/324 |
| 2009/0197681 A1 * | 8/2009 | Krishnamoorthy | A63F 13/12 463/42 |
| 2009/0204830 A1 | 8/2009 | Frid et al. | |
| 2010/0233989 A1 | 9/2010 | Constien et al. | |
| 2010/0321647 A1 | 12/2010 | Schuler et al. | |
| 2011/0302439 A1 | 12/2011 | Motoyama | |
| 2012/0071216 A1 | 3/2012 | Salsbery et al. | |
| 2012/0122526 A1 * | 5/2012 | Bockus et al. | 455/572 |
| 2012/0169608 A1 * | 7/2012 | Forutanpour et al. | 345/173 |
| 2013/0103960 A1 * | 4/2013 | Alberth et al. | 713/320 |
| 2015/0198996 A1 * | 7/2015 | Kliegman et al. | G06F 1/3212 |

* cited by examiner

*Primary Examiner* — Abdullah Al Kawsar

(74) *Attorney, Agent, or Firm* — Brandon C. Kennedy; Katherine S. Brown; Kennedy Lenart Spraggins LLP

(57) ABSTRACT

Methods, apparatuses, and computer program products for dynamic task completion scaling of system resources for a battery operated device are provided. Embodiments include determining, by task completion controller, availability of system resources; retrieving, by the task completion controller, historical user-specific task performance data corresponding to a user; and performing, by the task completion controller, a system action based on the determined availability of system resources and the retrieved historical user-specific task performance data.

20 Claims, 7 Drawing Sheets

DYNAMIC TASK COMPLETION SCALING OF SYSTEM RESOURCES FOR A BATTERY OPERATED DEVICE

BACKGROUND OF THE INVENTION

1. Field of the Invention

The field of the invention is data processing, or, more specifically, methods, apparatuses, and computer program products for dynamic task completion scaling of system resources for a battery operated device.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As the complexity of software and hardware components increase so too does the energy requirements for these components. Managing energy consumption in a battery operated device is a serious challenge when a user is performing multiple tasks with a plurality of these highly complex and energy consuming modules. The difficulty of this challenge may be increased by the fact that users are often performing multiple tasks, each of which is consuming system resources at different rates and at different times. Applications and software modules, that are able to assist a user in managing the dispersing of these systems resources is therefore useful.

SUMMARY OF THE INVENTION

Methods, apparatuses, and computer program products for dynamic task completion scaling of system resources for a battery operated device are provided. Embodiments include determining, by task completion controller, availability of system resources; retrieving, by the task completion controller, historical user-specific task performance data corresponding to a user; and performing, by the task completion controller, a system action based on the determined availability of system resources and the retrieved historical user-specific task performance data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
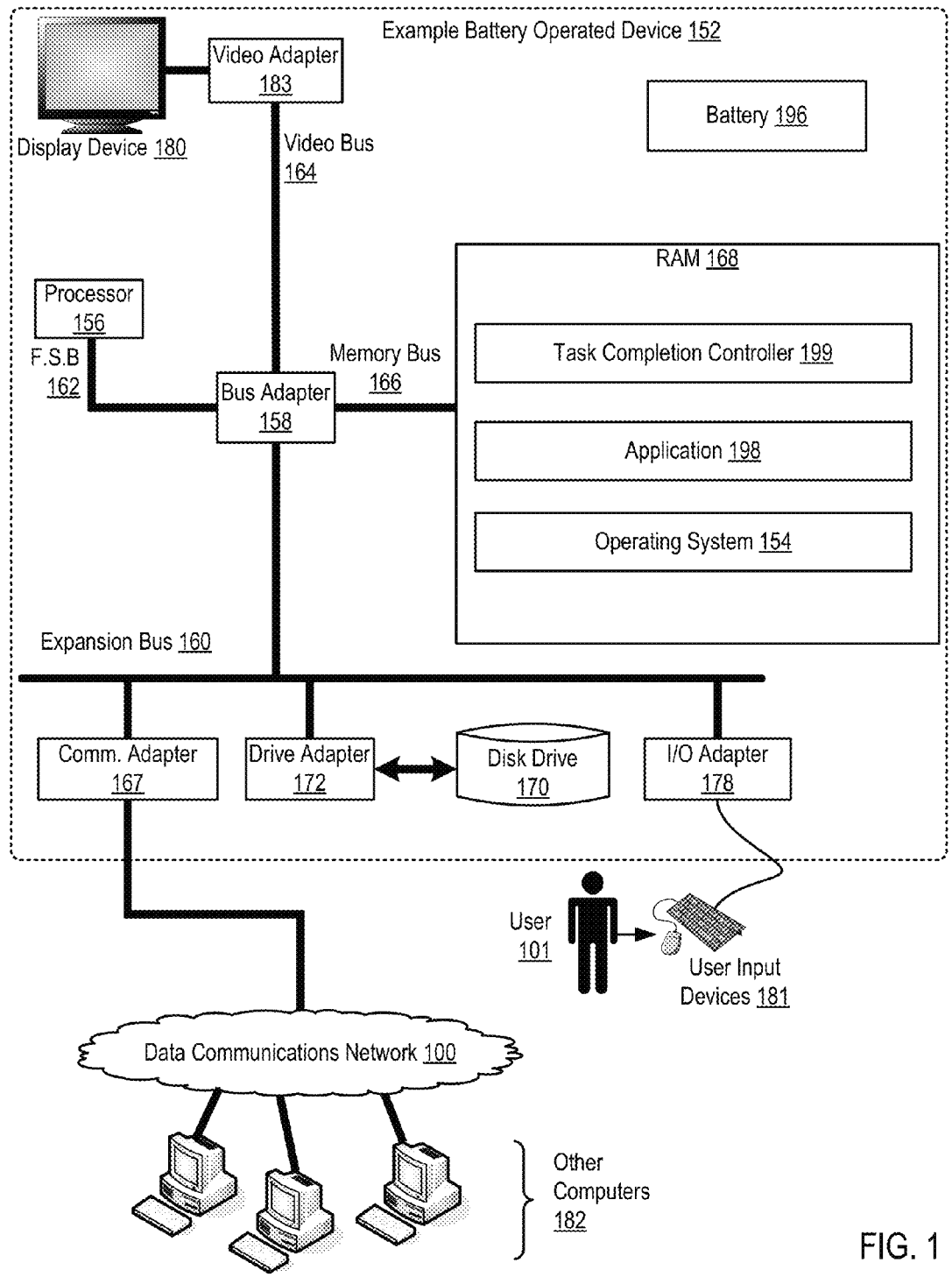
FIG. 1 sets forth a block diagram of automated computing machinery comprising an example battery operated device that includes a task completion controller useful for dynamic task completion scaling of system resources of the battery operated device according to embodiments of the present invention.

Exemplary methods, apparatus, and products for dynamic task completion scaling of system resources for a battery operated device in accordance with the present invention are described with reference to the accompanying drawings, beginning with FIG. 1. Dynamic task completion scaling of system resources for a battery operated device in accordance with the present invention is generally implemented with computers, that is, with automated computing machinery. FIG. 1 sets forth a block diagram of automated computing machinery comprising an example battery operated device that includes a task completion controller useful for dynamic task completion scaling of system resources of the battery operated device according to embodiments of the present invention. The battery operated device (152) of FIG. 1 includes at least one computer processor (156) or 'CPU' as well as random access memory (168) ('RAM') which is connected through a high speed memory bus (166) and bus adapter (158) to processor (156) and to other components of the battery operated device (152). The battery operated device (152) includes a battery (196) for powering the various computer circuitry of the device.

Stored in RAM (168) is a task completion controller (199) that includes computer program instructions improved for dynamic task completion scaling of system resources for a battery operated device according to embodiments of the present invention. The task completion controller (199) includes computer program instructions that when executed by the computer processor (156) cause the task completion controller (199) to carry out the steps of: determining availability of system resources of the battery operated device; retrieving historical user-specific task performance data corresponding to a user; and performing a system action based on the determined availability of system resources and the retrieved historical user-specific task performance data.

Also stored in RAM (168) is an application (198) and an operating system (154). An application is a piece of software that performs a plurality of tasks. In the example of FIG. 1, the task completion controller (199) is configured to perform system actions related to the tasks of the application (198).

Operating systems useful dynamic task completion scaling of system resources for a battery operated device according to embodiments of the present invention include UNIX™, Linux™, Microsoft XP™, AIX™, IBM's i5/OS™, and others as will occur to those of skill in the art. The operating system (154), the task completion controller (199), and the application (198) in the example of FIG. 1 are shown in RAM (168), but many components of such software typically are stored in non-volatile memory also, such as, for example, on a disk drive (170).

The battery operated device (152) of FIG. 1 includes disk drive adapter (172) coupled through expansion bus (160) and bus adapter (158) to processor (156) and other components of the battery operated device (152). Disk drive adapter (172) connects non-volatile data storage to the battery operated device (152) in the form of disk drive (170). Disk drive adapters useful in computers for dynamic task completion scaling of system resources for a battery operated device according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example battery operated device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example battery operated device (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary battery operated device (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamic task completion scaling of system resources for a battery operated device according to embodiments of the present invention include modems for wired dial-up communications, Ethernet (IEEE 802.3) adapters for wired data communications network communications, and 802.11 adapters for wireless data communications network communications.

Figure 2:
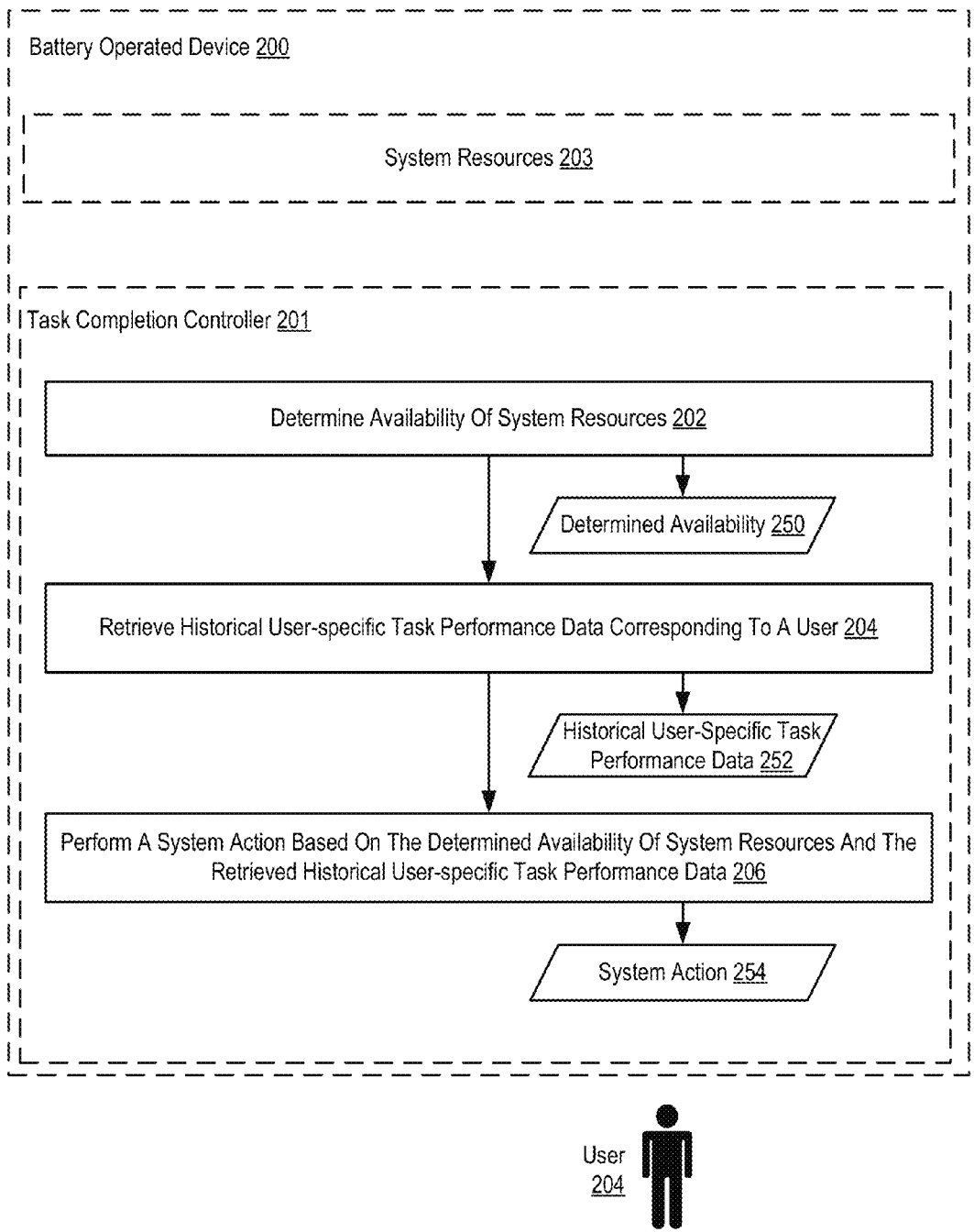
FIG. 2 sets forth a flow chart illustrating an exemplary method for dynamic task completion scaling of system resources for a battery operated device according to embodiments of the present invention.

For further explanation, FIG. 2 sets forth a flow chart illustrating an exemplary method for dynamic task completion scaling of system resources for a battery operated device according to embodiments of the present invention. The method of FIG. 2 includes determining (202), by a task completion controller (201), availability (250) of system resources (203) of the battery operated device (200). Determining (202), by a task completion controller (201), availability (250) of system resources (203) of the battery operated device (200) may be carried out by retrieving an indication of battery level.

The method of FIG. 2 also includes retrieving (204), by the task completion controller (201), historical user-specific task performance data (252) corresponding to a user (204). Historical user-specific task performance data is data that provides an indication of how the user interacts with the device. For example, the task performance data may store what times and how long a user performs a specific task or tasks in general. In this example, the historical user-specific task performance data may indicate that the user plays video games every Tuesday from six p.m. to eight p.m. Retrieving (204), by the task completion controller (201), historical user-specific task performance data (252) corresponding to a user (204) may be carried out by examining a log detailing user device usage and interaction.

The method of FIG. 2 includes performing (206), by the task completion controller (201), a system action (254) based on the determined availability (250) of system resources and the retrieved historical user-specific task performance data (252). System actions are operations performed by an application. Examples of system actions include but are not limited to suggesting items to a user, such as tasks to perform, applications to play and game levels to select. System actions may also include modifying system resources and application settings and communicating with a remote application. Performing (206), by the task completion controller (201), a system action (254) based on the determined availability (250) of system resources and the retrieved historical user-specific task performance data (252) may be carried out by presenting a graphical user interface (GUI) to a user that suggests one or more options based on the availability of the system resources and the historical user-specific task performance data. For example, the task completion controller may recommend or implement changes to settings for tasks or system resources or even recommend performance of a different task or application. That is, tasks and system resources are dynamically scaled to match the availability of system resources.

Figure 3:
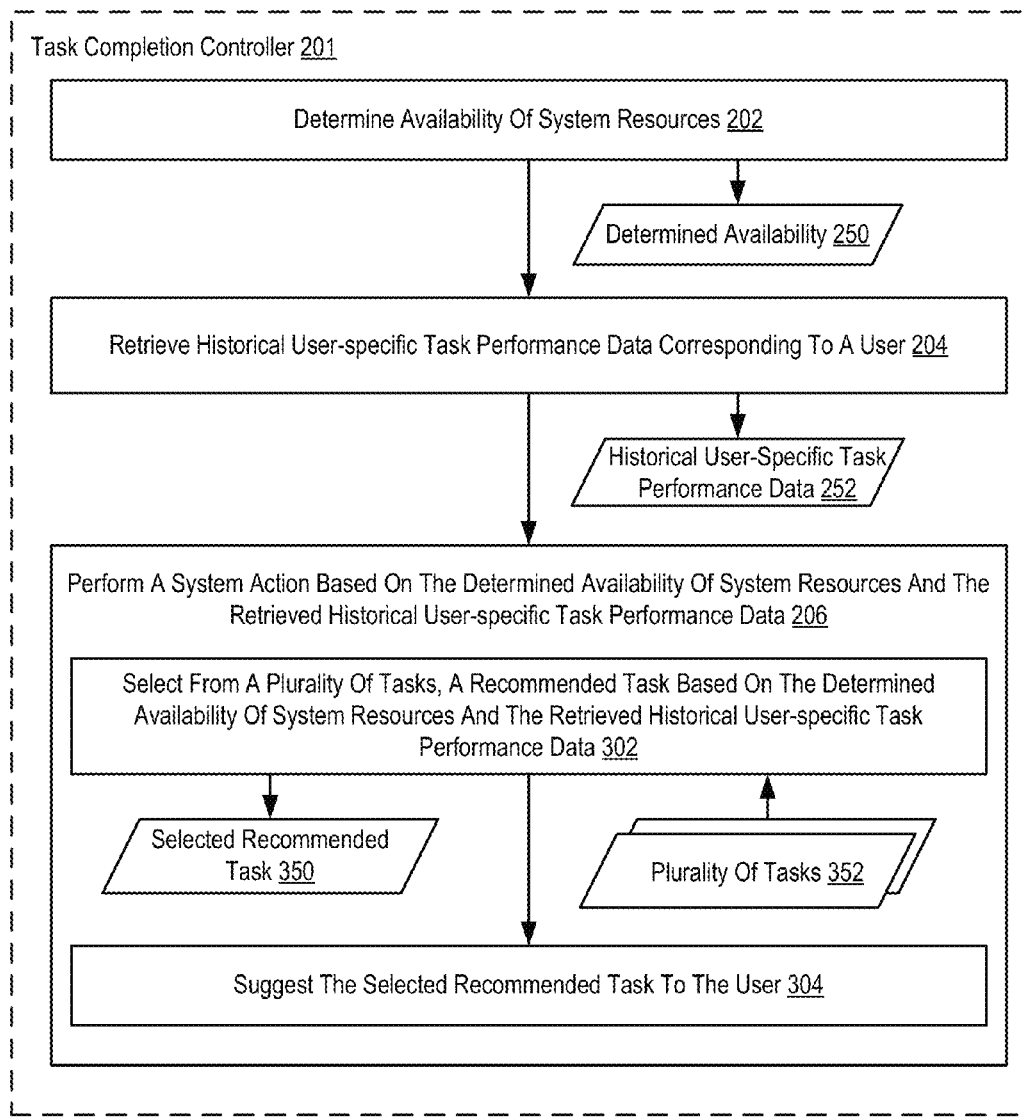
FIG. 3 sets forth a flow chart illustrating a further exemplary method for dynamic task completion scaling of system resources for a battery operated device according to embodiments of the present invention.

For further explanation, FIG. 3 sets forth a flow chart illustrating a further exemplary method for dynamic task completion scaling of system resources for a battery operated device according to embodiments of the present invention. The method of FIG. 3 is similar to the method of FIG. 2 in that the method of FIG. 3 also includes determining (202) availability (250) of system resources (203) of the battery operated device (200); retrieving (204) historical user-specific task performance data (252) corresponding to a user (204); and performing (206) a system action (254) based on the determined availability (250) of system resources and the retrieved historical user-specific task performance data (252).

In the method of FIG. 3, however, performing (206) a system action (254) based on the determined availability (250) of system resources and the retrieved historical user-specific task performance data (252) includes selecting (302) from a plurality of tasks (352), a recommended task (350) based on the determined availability (250) of system resources and the retrieved historical user-specific task performance data (252). Selecting (302) from a plurality of tasks (352), a recommended task (350) based on the determined availability (250) of system resources and the retrieved historical user-specific task performance data (252) may be carried out by determining the system resource requirements of each task; and identifying a task that can be completed with the available system resources. For example, the task completion controller may use the historical user-specific task performance data to determine how to ensure a user is able to complete a document, finish reading an article on a website, or complete a particular portion of a game. In the gaming task example, the task completion controller may recommend maps or specific games based on the aforementioned data, to ensure some form of gaming can be done over a desired time frame. For example, the task completion controller may determine that a first game uses one percent of the battery per minute and a second game uses one percent every three minutes. If a user is expected to play for thirty minutes and the availability of system resources indicates twelve percent battery life, the task completion controller may recommend the second game to the user.

In the method of FIG. 3, however, performing (206) a system action (254) based on the determined availability (250) of system resources and the retrieved historical user-specific task performance data (252) includes suggesting (304) the selected recommended task (350) to the user (204). Suggesting (304) the selected recommended task (350) to the user (204) may be carried out by presenting a graphical user interface to the user that includes one or more popup windows, lists, options or other selectable objects or messages as will occur to those of skill in the art.

Figure 4:
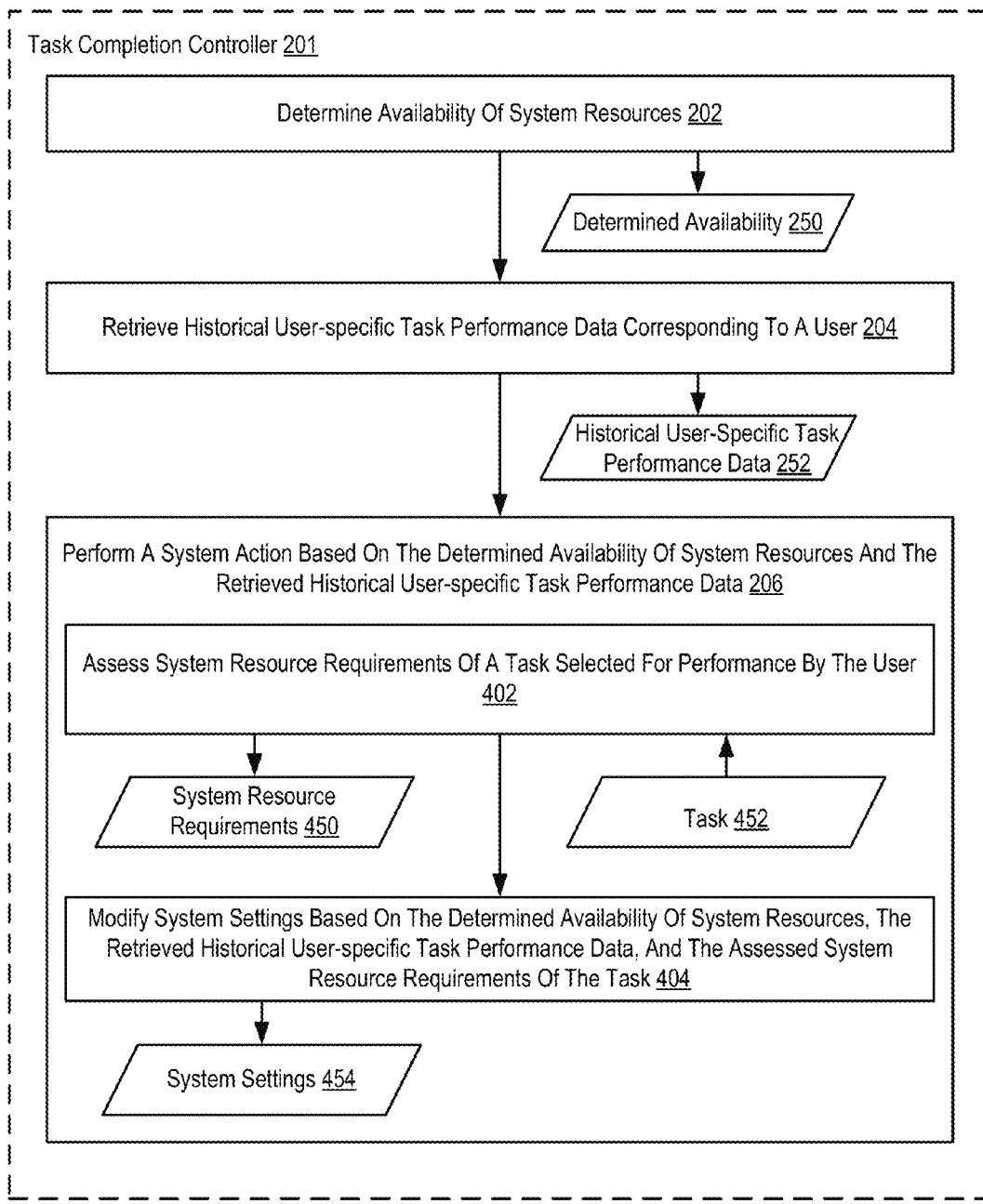
FIG. 4 sets forth a flow chart illustrating a further exemplary method for dynamic task completion scaling of system resources for a battery operated device according to embodiments of the present invention.

For further explanation, FIG. 4 sets forth a flow chart illustrating a further exemplary method for dynamic task completion scaling of system resources for a battery operated device according to embodiments of the present invention. The method of FIG. 4 is similar to the method of FIG. 2 in that the method of FIG. 4 also includes determining (202) availability (250) of system resources (203) of the battery operated device (200); retrieving (204) historical user-specific task performance data (252) corresponding to a user (204); and performing (206) a system action (254) based on the determined availability (250) of system resources and the retrieved historical user-specific task performance data (252).

In the method of FIG. 4, however, performing (206) a system action (254) based on the determined availability (250) of system resources and the retrieved historical user-specific task performance data (252) includes assessing (402) system resource requirements (450) of a task (452) selected for performance by the user (204). System resource requirements are the minimum system resource levels needed to perform a task. Examples of system resource requirements include but are not limited to amount of power needed to perform the task, minimum graphical rendering level, and network communication actions. Determining that a particular task will consume a particular amount of power may require an assessment of the performance of the task, such as the rate of battery drain while playing a game. Assessing (402) system resource requirements (450) of a task (452) selected for performance by the user (204) may be carried out by estimating the requirements for performance of the task. For example, the task completion controller (201) may interface with an application or remote server to determine how long a particular task takes to perform, apply a consumption rate to the performance of that task, and predict minimum battery level needed to accomplish the task. For example, a user may join a multi-player game at a particular location in the game having a particular map name. The task completion controller may determine that the average run time (or completion time) for this map is five minutes with an expected consumption rate of x % of battery life due to textures used, complexity of geometry, number of players, etc. Based on this calculation, the task completion controller may determine that at least five percent battery life is required to perform this task.

In the method of FIG. 4, however, performing (206) a system action (254) based on the determined availability (250) of system resources and the retrieved historical user-specific task performance data (252) includes modifying (404) system settings (454) based on the determined availability (250) of system resources, the retrieved historical user-specific task performance data (252), and the assessed system resource requirements (450) of the task (454) selected for performance by the user (204). Examples of system settings include but are not limited to screen brightness of the battery operated device, graphics rendering level, network communication performance, and network connectivity settings. Modifying (404) system settings (454) based on the determined availability (250) of system resources, the retrieved historical user-specific task performance data (252), and the assessed system resource requirements (450) of the task (454) selected for performance by the user (204) may be carried out by changing the brightness level, graphics rendering, or network connectivity of the battery operated device.

For example, the task completion controller may determine that an average completion time for a current task is seventy minutes and the availability of system resources indicates that there is fifty-five minutes of battery available while performing this task using the current system settings. In this example, the task completion controller may change the system settings such that graphics rendering until the task is complete.

As another example, the task completion controller may determine that the historical user-specific task performance data indicates that a user typically plays games from six to eight pm on Tuesdays. The task completion controller may also determine that performance of tasks, such as playing games, using the current system settings will cause the battery to fail before the normal end of 8 pm on Tuesday. In this example, the task completion controller may adjust the system settings such that graphics rendering, brightness level, and network communications are scaled down to ensure the device runs until at least eight pm. The amount of scale down may change over time or as new games or started over that period of time.

Figure 5:
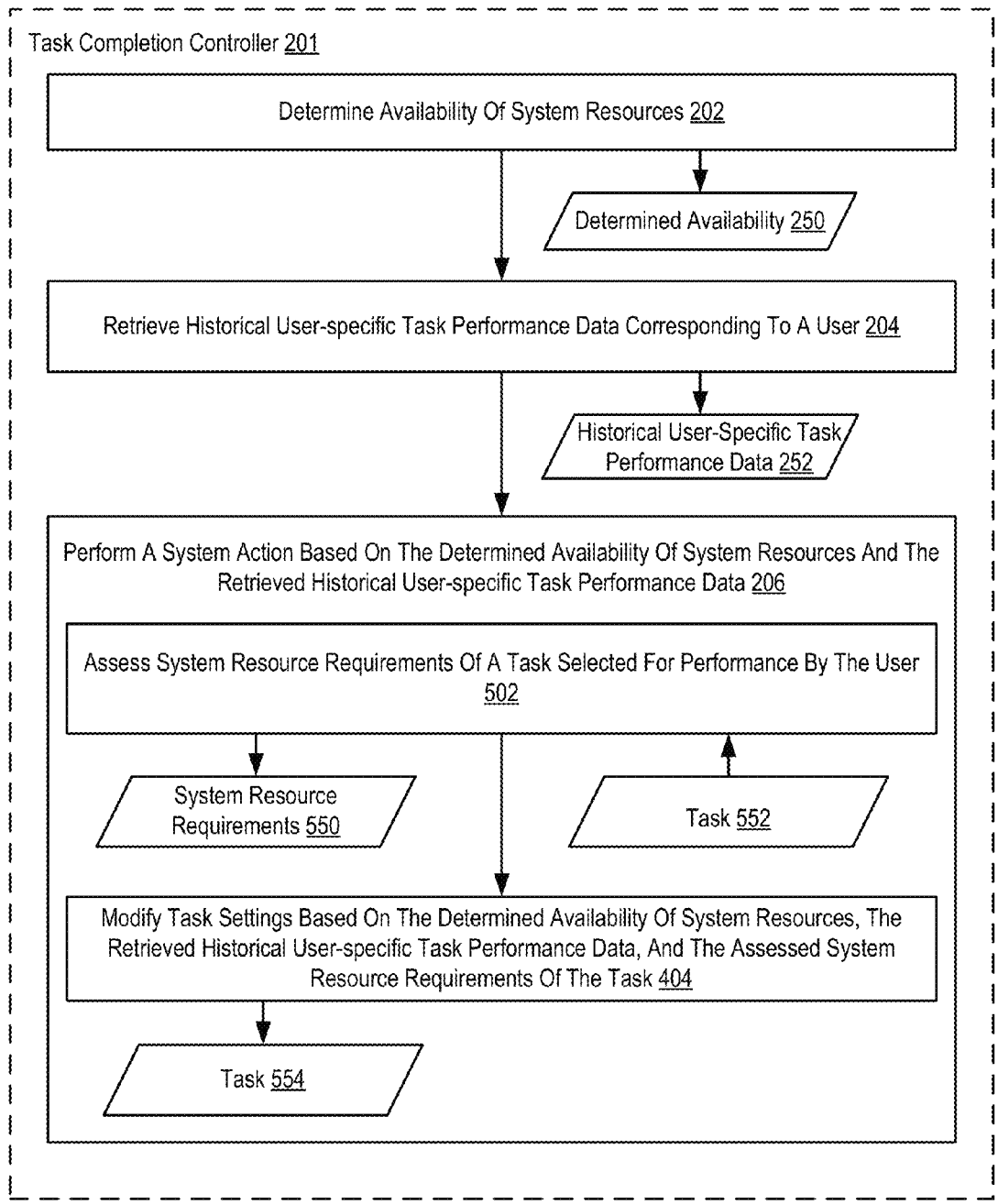
FIG. 5 sets forth a flow chart illustrating a further exemplary method for dynamic task completion scaling of system resources for a battery operated device according to embodiments of the present invention.

For further explanation, FIG. 5 sets forth a flow chart illustrating a further exemplary method for dynamic task completion scaling of system resources for a battery operated device according to embodiments of the present invention. The method of FIG. 5 is similar to the method of FIG. 2 in that the method of FIG. 5 also includes determining (202) availability (250) of system resources (203) of the battery operated device (200); retrieving (204) historical user-specific task performance data (252) corresponding to a user (204); and performing (206) a system action (254) based on the determined availability (250) of system resources and the retrieved historical user-specific task performance data (252).

In the method of FIG. 5, however, performing (206) a system action (254) based on the determined availability (250) of system resources and the retrieved historical user-specific task performance data (252) includes assessing (502) system resource requirements (550) of a task (552) selected for performance by the user (204). Assessing (502) system resource requirements (550) of a task (552) selected for performance by the user (204) may be carried out by estimating the requirements for performance of the task.

In the method of FIG. 5, however, performing (206) a system action (254) based on the determined availability (250) of system resources and the retrieved historical user-specific task performance data (252) includes modifying (504) task settings (554) based on the determined availability (250) of system resources, the retrieved historical user-specific task performance data (252), and the assessed system resource requirements (550) of the task (554) selected for performance by the user (204). Examples of task settings include but are not limited to graphic rendering level, network communication performance, and other application characteristics and parameters that may be changed by a user as will occur to one of skill in the art. Modifying (504) task settings (554) based on the determined availability (250) of system resources, the retrieved historical user-specific task performance data (252), and the assessed system resource requirements (550) of the task (554) selected for performance by the user (204) may be carried out by communicating with a task, application, or remote server to change one or more settings.

Figure 6:
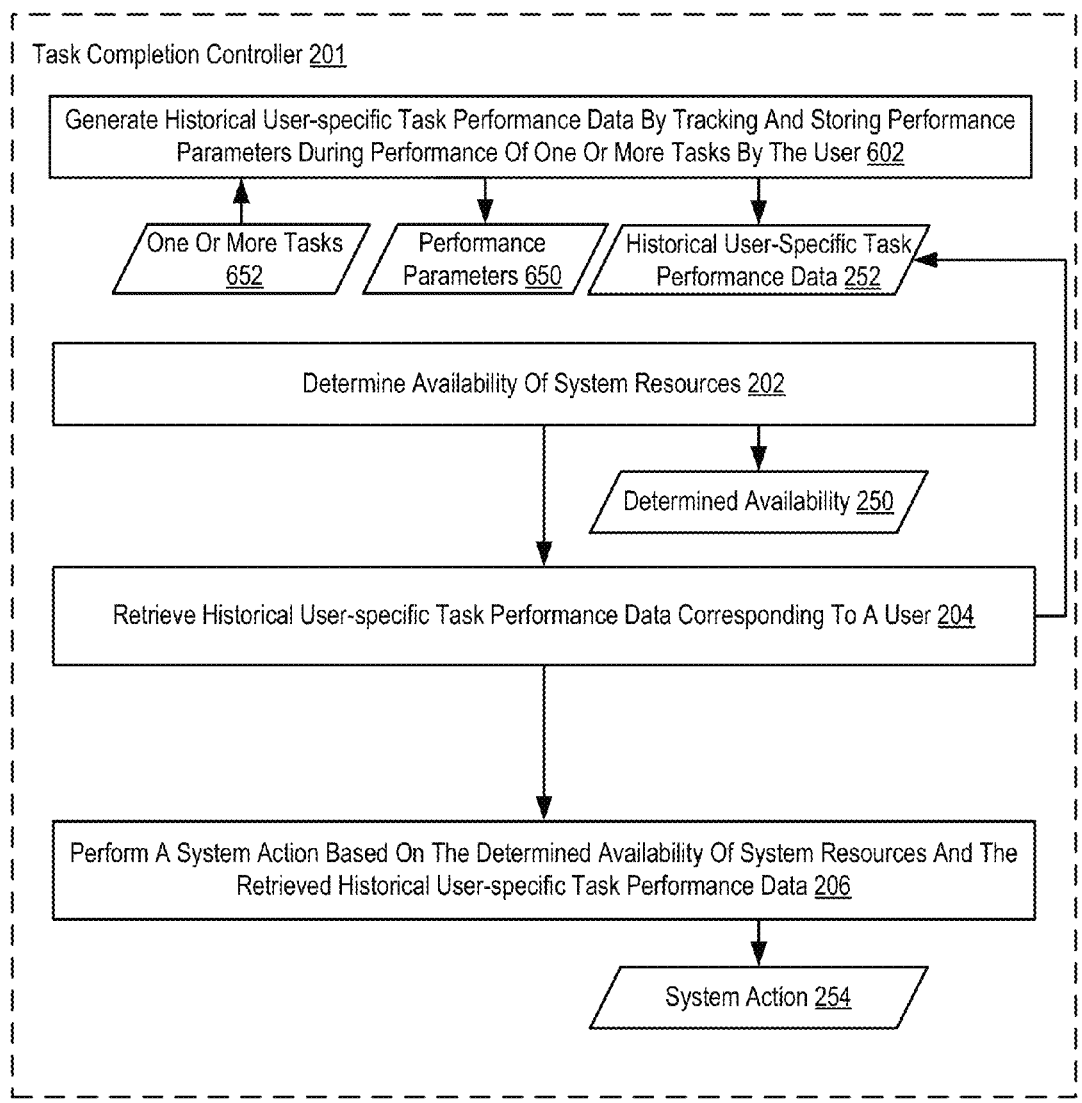
FIG. 6 sets forth a flow chart illustrating a further exemplary method for dynamic task completion scaling of system resources for a battery operated device according to embodiments of the present invention.

For further explanation, FIG. 6 sets forth a flow chart illustrating a further exemplary method for dynamic task completion scaling of system resources for a battery operated device according to embodiments of the present invention. The method of FIG. 6 is similar to the method of FIG. 2 in that the method of FIG. 6 also includes determining (202) availability (250) of system resources (203) of the battery operated device (200); retrieving (204) historical user-specific task performance data (252) corresponding to a user (204); and performing (206) a system action (254) based on the determined availability (250) of system resources and the retrieved historical user-specific task performance data (252).

The method of FIG. 6 includes generating (602) the historical user-specific task performance data (252) by tracking and storing performance parameters (650) during performance of one or more tasks (652) by the user (204). Examples of performance parameters include but are not limited to a duration that the user spends performing the one or more tasks and specific times that the user performs the one or more tasks. Generating (602) the historical user-specific task performance data (252) by tracking and storing performance parameters (650) during performance of one or more tasks (652) by the user (204) may be carried out by tracking when and for how long a user performs a task, such as reading for three hours every night or playing video games every Monday for two hours.

Figure 7:
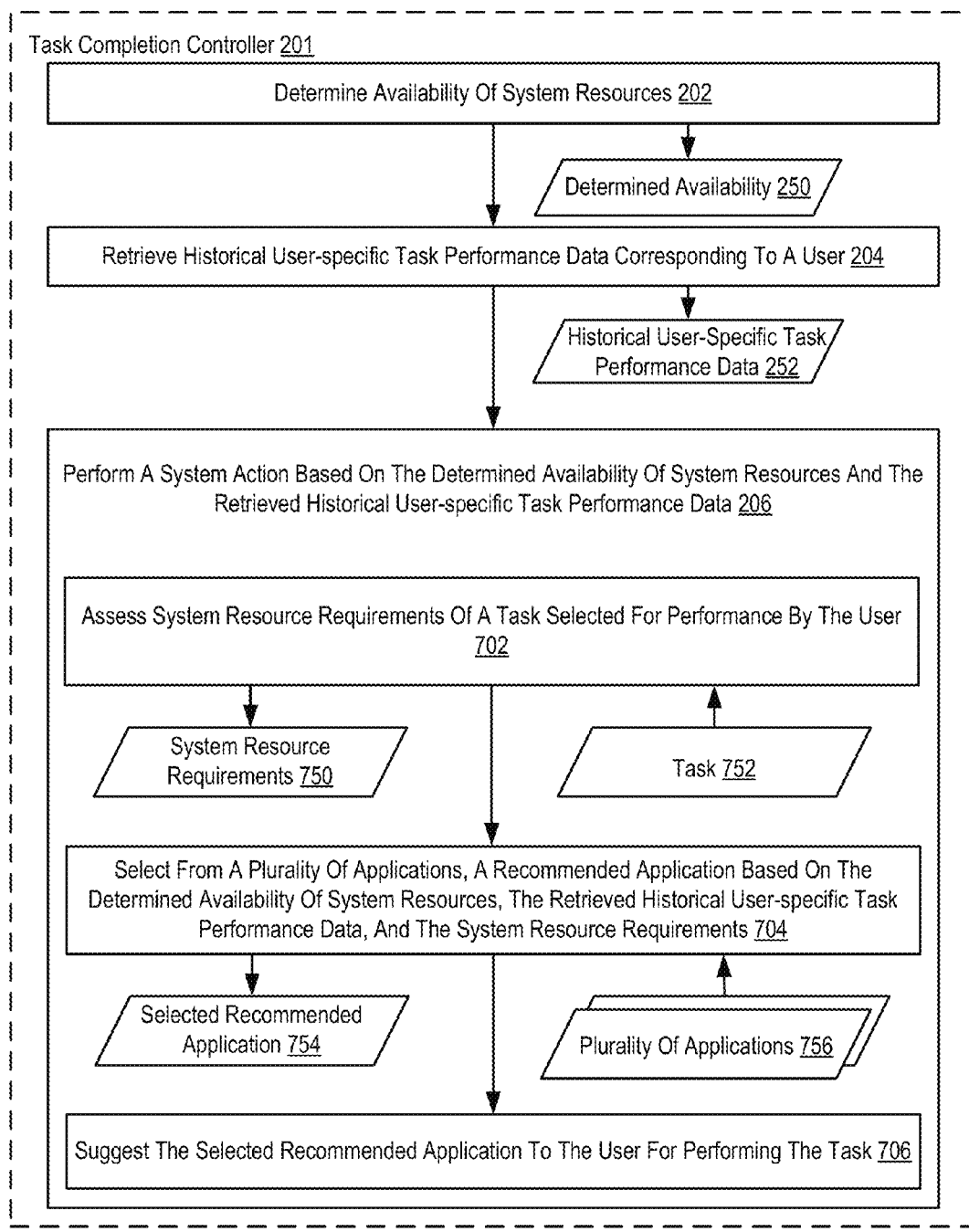
FIG. 7 sets forth a flow chart illustrating a further exemplary method for dynamic task completion scaling of system resources for a battery operated device according to embodiments of the present invention.

For further explanation, FIG. 7 sets forth a flow chart illustrating a further exemplary method for dynamic task completion scaling of system resources for a battery operated device according to embodiments of the present invention. The method of FIG. 7 is similar to the method of FIG. 2 in that the method of FIG. 7 also includes determining (202) availability (250) of system resources (203) of the battery operated device (200); retrieving (204) historical user-specific task performance data (252) corresponding to a user (204); and performing (206) a system action (254) based on the determined availability (250) of system resources and the retrieved historical user-specific task performance data (252).

In the method of FIG. 7, performing (206) a system action (254) based on the determined availability (250) of system resources and the retrieved historical user-specific task performance data (252) includes assessing (702) system resource requirements (750) of a task (752) selected for performance by the user (204). System resource requirements are the minimum system resource levels needed to perform a task. Examples of system resource requirements include but are not limited to amount of power needed to perform the task, minimum graphical rendering level, and network communication actions. Determining that a particular task will consume a particular amount of power may require an assessment of the performance of the task, such as the rate of battery drain while playing a game. Assessing (702) system resource requirements (750) of a task (752) selected for performance by the user (204) may be carried out by estimating the requirements for performance of the task. For example, the task completion controller (201) may interface with an application or remote server to determine how long a particular task takes to perform, apply a consumption rate to the performance of that task, and predict minimum battery level needed to accomplish the task. For example, a user may join a multi-player game at a particular location in the game having a particular map name. The task completion controller may determine that the average run time (or completion time) for this map is five minutes with an expected consumption rate of x % of battery life due to textures used, complexity of geometry, number of players, etc. Based on this calculation, the task completion controller may determine that at least five percent battery life is required to perform this task.

In the method of FIG. 7, however, performing (206) a system action (254) based on the determined availability (250) of system resources and the retrieved historical user-specific task performance data (252) also includes selecting (704) from a plurality of applications (756), a recommended application (754) based on the determined availability (250) of system resources, the retrieved historical user-specific task performance data (252), and the system resource requirements (750) of the task selected for performance by the user. Selecting (704) from a plurality of applications (756), a recommended application (754) based on the determined availability (250) of system resources, the retrieved historical user-specific task performance data (252), and the system resource requirements (750) of the task selected for performance by the user may be carried out by determining the power consumption rates of each application; and based on the determined power consumption rates, selecting an application that meets the system resource requirements of the task to be performed. For example, faced with low system resources, the task completion controller (201) may recommend an application to a user to ensure the user is able to complete a task, such as reading a document or finish reading an article on a website. In this example, the task completion controller may recommend the lightest weight application that a user has installed.

In the method of FIG. 7, performing (206) a system action (254) based on the determined availability (250) of system resources and the retrieved historical user-specific task performance data (252) includes suggesting (706) the selected recommended application (754) to the user (204). Suggesting (706) the selected recommended application (754) to the user (204) may be carried out by presenting a graphical user interface to the user that includes one or more popup windows, lists, options or other selectable objects or messages as will occur to those of skill in the art.

Exemplary embodiments of the present invention are described largely in the context of a fully functional computer system for dynamic task completion scaling of system resources for a battery operated device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by first program instructions on a battery operated computing device, receiving a user selection of a first task for performance at the battery operated computing device;
determining availability of system resources of the battery operated computing device;
retrieving historical user-specific task performance data corresponding to the user of the battery operated computing device; and
performing at the battery operated computing device, a system action based on the determined availability of system resources and the retrieved historical user-specific task performance data, wherein the system action is performed from a plurality of system actions comprising:
selecting from a plurality of tasks, a recommended second task based on the determined availability of system resources and the retrieved historical user-specific task performance data, wherein the plurality of tasks include specific portions of a first application, respective specific portions of the first application being separate and distinct; and
selecting from a plurality of applications, a recommended application for performing the first task selected for performance by the user based on the determined availability of system resources, the retrieved historical user-specific task performance data, and system resource requirements of the first task selected for performance by the user, wherein the selection of the recommended application is performed by:
assessing the system resource requirements of the first task selected for performance by the user at the battery operated computing device;
determining power consumption rates of each application of the plurality of applications; and
selecting, based on the determined power consumption rates, the recommend application that meets the system resource requirements of the first task.

2. The method of claim 1 wherein performing a system action based on the determined availability of system resources and the retrieved historical user-specific task performance data further includes:
assessing the system resource requirements of the first task selected for performance by the user; and
modifying system settings associated with the system resources based on the determined availability of system resources, the retrieved historical user-specific task performance data, and the assessed system resource requirements of the first task selected for performance by the user.

3. The method of claim 2 wherein the system settings include at least one of brightness of the battery operated computing device, graphics rendering level, network communication performance, and network connectivity settings.

4. The method of claim 1 wherein performing a system action based on the determined availability of system resources and the retrieved historical user-specific task performance data further includes:
assessing the system resource requirements of the first task selected for performance by the user at the battery operated computing device; and
modifying task settings associated with the first task based on the determined availability of system resources, the retrieved historical user-specific task performance data, and the assessed system resource requirements of the first task selected for performance by the user.

5. The method of claim 4 wherein the task settings specify network communication performance.

6. The method of claim 1 further comprising generating the historical user-specific task performance data by tracking and storing performance parameters during performance of one or more tasks at the battery operated computing device by the user.

7. The method of claim 6 wherein the performance parameters include at least one of a duration that the user spends performing the one or more tasks and specific times that the user performs the one or more tasks.

8. The method of claim 1 wherein performing a system action based on the determined availability of system resources and the retrieved historical user-specific task performance data further includes suggesting the selected recommended application to the user for performing the first task.

9. The method of claim 1 wherein the first application includes a game and the specific portions include maps of the game.

10. An apparatus comprising a battery operated computing device having a battery, a computer processor, and a computer memory operatively coupled to the computer processor, the computer memory including computer program instructions that, when executed by the computer processor, cause the apparatus to perform operations comprising:
receiving a user selection of a first task for performance at the battery operated computing device;
determining availability of system resources of the battery operated computing device;
retrieving historical user-specific task performance data corresponding to the user of the battery operated computing device; and
performing at the battery operated computing device, a system action based on the determined availability of system resources and the retrieved historical user-specific task performance data, wherein the system action is performed from a plurality of system actions comprising:
selecting from a plurality of tasks, a recommended second task based on the determined availability of system resources and the retrieved historical user-specific task performance data, wherein the plurality of tasks include specific portions of a first application, respective specific portions of the first application being separate and distinct; and
selecting from a plurality of applications, a recommended application for performing the first task selected for performance by the user based on the determined availability of system resources, the retrieved historical user-specific task performance data, and system resource requirements of the first task selected for performance by the user, wherein the selection of the recommended application is performed by:
assessing the system resource requirements of the first task selected for performance by the user at the battery operated computing device;
determining power consumption rates of each application of the plurality of applications; and
selecting, based on the determined power consumption rates, the recommend application that meets the system resource requirements of the first task.

11. The apparatus of claim 10 wherein performing a system action based on the determined availability of system resources and the retrieved historical user-specific task performance data further includes:
assessing the system resource requirements of the first task selected for performance by the user; and
modifying system settings associated with the system resources based on the determined availability of system resources, the retrieved historical user-specific task performance data, and the assessed system resource requirements of the first task selected for performance by the user.

12. The apparatus of claim 11 wherein the system settings include at least one of brightness of the battery operated computing device, graphics rendering level, network communication performance, and network connectivity settings.

13. The apparatus of claim 10 wherein performing a system action based on the determined availability of system resources and the retrieved historical user-specific task performance data further includes:
assessing the system resource requirements of the first task selected for performance by the user at the battery operated computing device; and
modifying task settings associated with the first task based on the determined availability of system resources, the retrieved historical user-specific task performance data, and the assessed system resource requirements of the first task selected for performance by the user.

14. The apparatus of claim 13 wherein the task settings specify network communication performance.

15. The apparatus of claim 10 further comprising generating the historical user-specific task performance data by tracking and storing performance parameters during performance of one or more tasks at the battery operated computing device by the user.

16. The apparatus of claim 15 wherein the performance parameters include at least one of a duration that the user spends performing the one or more tasks and specific times that the user performs the one or more tasks.

17. The apparatus of claim 10 wherein the first application includes a game and the specific portions include maps of the game.

18. A computer program product including a computer readable storage medium, wherein the computer readable storage medium is not a signal, the computer program product comprising computer program instructions that, when executed, cause a computer to perform operations comprising:
receiving a user selection of a first task for performance at the battery operated computing device;
determining availability of system resources of the battery operated computing device;
retrieving historical user-specific task performance data corresponding to the user of the battery operated computing device; and
performing at the battery operated computing device, a system action based on the determined availability of system resources and the retrieved historical user-specific task performance data, wherein the system action is performed from a plurality of system actions comprising:
selecting from a plurality of tasks, a recommended second task based on the determined availability of system resources and the retrieved historical user-specific task performance data, wherein the plurality of tasks include specific portions of a first application, respective specific portions of the first application being separate and distinct; and
selecting from a plurality of applications, a recommended application for performing the first task selected for performance by the user based on the determined availability of system resources, the retrieved historical user-specific task performance data, and system resource requirements of the first task selected for performance by the user, wherein the selection of the recommended application is performed by:
assessing the system resource requirements of the first task selected for performance by the user at the battery operated computing device;
determining power consumption rates of each application of the plurality of applications; and
selecting, based on the determined power consumption rates, the recommend application that meets the system resource requirements of the first task.

19. The computer program product of claim 18 wherein performing a system action based on the determined availability of system resources and the retrieved historical user-specific task performance data further includes:
assessing the system resource requirements of the first task selected for performance by the user; and modifying system settings associated with the system resources based on the determined availability of system resources, the retrieved historical user-specific task performance data, and
the assessed system resource requirements of the first task selected for performance by the user.

20. The computer program product of claim 18 wherein the first application includes a game and the specific portions include maps of the game.

* * * * *